UNITED STATES PATENT OFFICE.

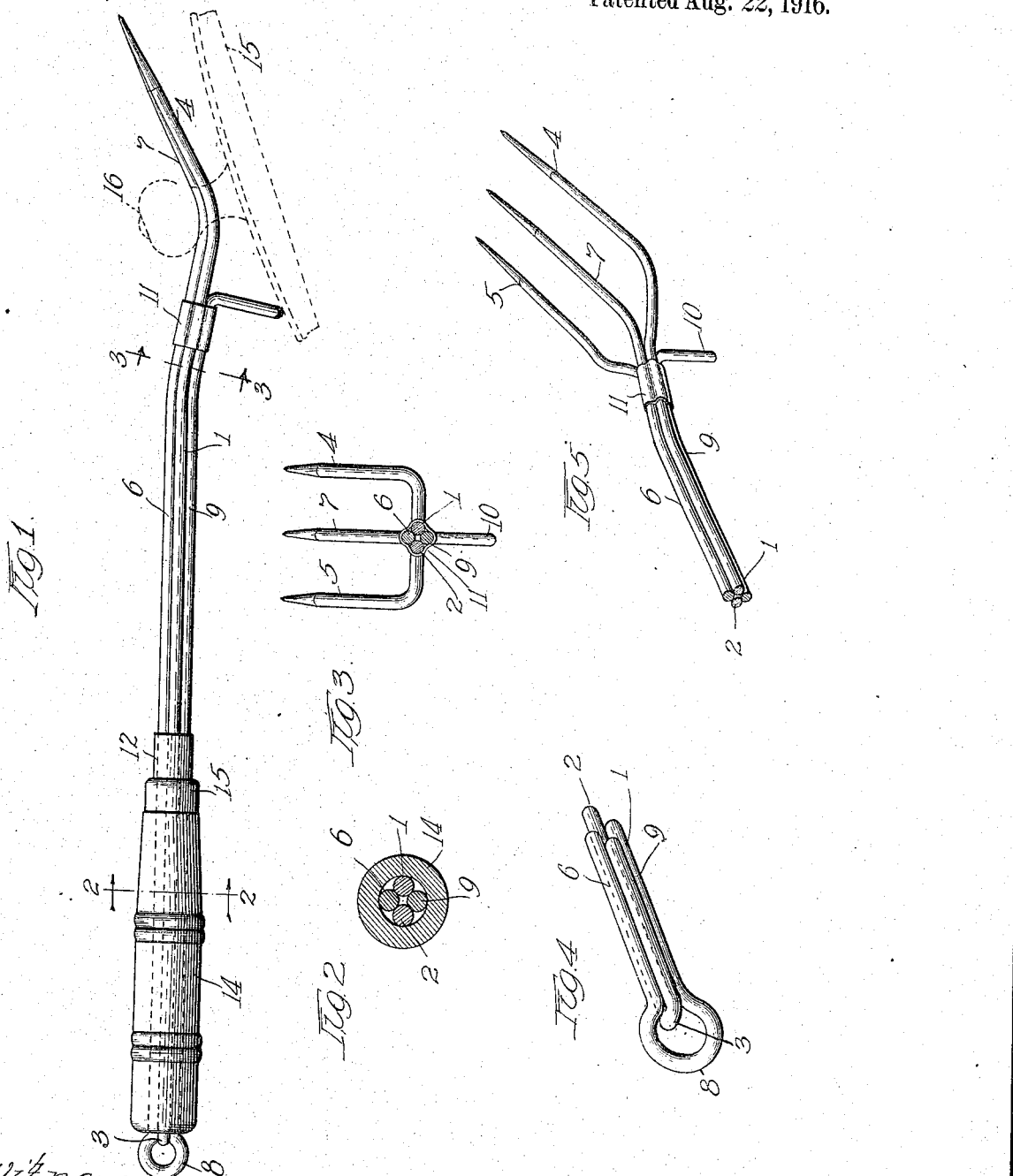
G. K. BURKE.
FORK.
APPLICATION FILED JAN. 7, 1915.
1,195,650.
Patented Aug. 22, 1916.
Witnesses:
Inventor:
Grace K. Burke
By Hill & Hill attys

GRACE K. BURKE, OF CHICAGO, ILLINOIS.

FORK.

1,195,650.  Specification of Letters Patent.  Patented Aug. 22, 1916.

Application filed January 7, 1915. Serial No. 1,030.

*To all whom it may concern:*

Be it known that I, GRACE K. BURKE, a citizen of the United States, a resident of Chicago, in the county of Cook and State of Illinois, have invented certain new and useful Improvements in Forks, of which the following is a description.

My invention belongs to that general class of devices known as culinary utensils, and relates particularly to an improved fork, or like utensil.

The invention has among its objects the production of a fork of the kind described that is simple, convenient, durable and satisfactory.

It also has among its objects the production of a utensil which may be used for lifting kettle covers, or drawing hot kettles, pans, or other vessels from the oven or from the stove. It is well known to those skilled in the art that burns are frequently the result of trying to draw a hot kettle from the oven or from the burner, or from lifting a cover from a steaming vessel. Frequently not only is the user burned but the vessel is upset. With my improved utensil the work is simplified and the danger from burns and accidents obviated.

Other advantages will appear to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts, Figure 1 is a side elevation of my improved form of fork; Fig. 2 is a sectional view taken substantially on line 2, 2 of Fig. 1; Fig. 3 is a sectional view taken substantially on line 3, 3 of Fig. 1; Fig. 4 is a perspective view of one end of the fork, the handle removed, and Fig. 5 is a perspective view of the tine end of the fork.

Referring to the drawings, it may be mentioned that my preferred form of fork consists of a plurality of wires, two being shown, which are looped back upon themselves forming a shank of four wires. In the particular fork shown the shank consists of a wire 1—2, looped back at 3, and a wire 6—9 looped back at 8. The wires are arranged together and secured as hereafter described. The wire 1—2 is offset and bent to form tines or prongs 4 and 5, the same being preferably sharpened or pointed in the usual manner. One end of the wire 6—9 is extended and bent as at 7 to form an additional tine or prong, preferably lying midway between the tines 4 and 5. The end 10 of the part 9 is offset and bent preferably at the lace of the tines 4, 5 and 7, as most clearly shown in Figs. 1 and 5. The length of the extending part 10 may be as desired, and the same may be bent at the desired angles relative to the other parts. The wires are secured together by clips or binders 11 and 12, or their equivalents for the purpose.

Arranged on the end of the wire shank, which is made up of the parts 1, 2, 6 and 9, is a tubular handle 14 of any suitable material, as for example wood being found very satisfactory. If desired, a ferrule 15 may be arranged as shown in the other construction. It will be noted that the looped part 8 of the wire 6 and 9 forms a very convenient ring at the end of the handle, and at the same time prevents the handle from slipping off the end of the shank. The looped end 3 of the other wire extends substantially through loop 8, so that wire cannot be drawn through the opening in the handle. In assembling the device the wires looped as shown are extended through the handle and secured by binders 11 and 12, and the tines 4, 5 and 7 and hook 10 thus formed.

In use the fork may be used as is any fork. I have shown in Fig. 1 a dotted cover 15, having the usual knob 16, or the equivalent, thereon. To raise the cover the knob 16, or equivalent handle, is engaged by the tines 4 and 7 or 5 and 7, and the cover lifted, the extension 10 bearing down on the same and tending to brace it and prevent its rocking and swaying. If it is desired to use the fork in removing a vessel, as for example a pan or kettle from an oven or from other kinds of heat, the edge of the vessel or the handle or other suitable part thereof, is engaged by the extension 10. When not in use the fork may be hung up by means of the loop 8. While I have shown the fork constructed of two wires bent and looped as shown, any additional wires may, of course, be embedded in the fork, forming additional tines or additional extensions 10, disposed as preferred.

Having thus described my invention, it is obvious that various immaterial modifications may be made in the same without de- parting from the spirit of my invention; hence I do not wish to be understood as limiting myself to the exact form, construction, arrangement or combination of parts herein shown and described, or uses mentioned.

What I claim as new and desire to secure by Letters Patent is:—

1. A fork of the character described, comprising a pair of tines formed on wire shank portions, an intermediate tine formed on a shank overlying said first mentioned shank portions and internested therewith, another shank portion underlying said first mentioned shank portion and internesting therewith, all the shank portions being parallel with respect to each other and connected to their tines by integral intermediate portions deflecting slightly downwardly from the shank portions, the tines projecting upwardly at a substantial angle to the intermediate connecting portions and a downwardly bent part on the underlying shank being disposed at approximately right angles to the downwardly deflected intermediate connecting portions and positioned between the ends of the said intermediate connecting portions, for the purposes described.

2. A fork of the character described, comprising a pair of tines formed on wire shank portions, an intermediate tine formed on a shank portion overlying said first mentioned shank portions and internested therewith, another shank portion underlying said first mentioned shank portion and internested therewith, the tines being connected to their shank portions by intermediate connecting portions deflected downwardly from the shank portions, the tines projecting upwardly at a substantial angle to the shank portions to provide a seat, and a downwardly bent fulcrum on the underlying shank positioned near the tines, substantially as and for the purposes described.

In testimony whereof, I have hereunto signed my name in the presence of two subscribing witnesses.

GRACE K. BURKE.

Witnesses:
 Roy W. Hill,
 Charles I. Cobb.

Copies of this patent may be obtained for five cents each, by addressing the "Commissioner of Patents, Washington, D. C."